(12) United States Patent
Turtinen et al.

(10) Patent No.: US 11,916,640 B2
(45) Date of Patent: Feb. 27, 2024

(54) REPORTING BEAM FAILURE

(71) Applicant: NOKIA TECHNOLOGIES OY, Espoo (FI)

(72) Inventors: Samuli Turtinen, Ii (FI); Timo Koskela, Oulu (FI); Chunli Wu, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/879,437

(22) Filed: Aug. 2, 2022

(65) Prior Publication Data

US 2022/0368404 A1    Nov. 17, 2022

Related U.S. Application Data

(63) Continuation of application No. 17/216,935, filed on Mar. 30, 2021, now Pat. No. 11,496,205.

(30) Foreign Application Priority Data

Jun. 4, 2020    (WO) ................ PCT/CN2020/083423

(51) Int. Cl.
*H04B 7/08*   (2006.01)
*H04W 74/08*   (2009.01)
(Continued)

(52) U.S. Cl.
CPC ........... *H04B 7/088* (2013.01); *H04L 1/1614* (2013.01); *H04W 74/0833* (2013.01);
(Continued)

(58) Field of Classification Search
CPC ...... H04B 7/088; H04B 7/022; H04B 7/0695; H04B 7/0617; H04L 1/1614;
(Continued)

(56) References Cited

U.S. PATENT DOCUMENTS 11,496,205 B2 * 11/2022 Turtinen ................ H04B 7/022
2013/0258885 A1    10/2013 Yu et al.
(Continued)

FOREIGN PATENT DOCUMENTS

CN    104205911 A    12/2014
EP    3 735 036 A1    11/2020
(Continued)

OTHER PUBLICATIONS

"3rd Generation Partnership Project; Technical Specification Group Radio Access Network; NR; Medium Access Control (MAC) protocol specification (Release 16)", 3GPP TS 38.321 v16.0.0, (Mar. 2020), 141 pages.

(Continued)

*Primary Examiner* — Harry H Kim
(74) *Attorney, Agent, or Firm* — ALSTON & BIRD LLP

(57) ABSTRACT

Example embodiments of the present disclosure relate to reporting beam failure. A terminal device performs beam failure detection on a first number of serving cells configured for the terminal device. The terminal device determines information to at least indicate respective results of the beam failure detection on a second number of serving cells among the first number of serving cells, where the second number is smaller than the first number. The determined information is transmitted by the terminal device to a network device serving the terminal device using a resource allocated for the terminal device. Based on the information, the network device determines an overall result of the beam failure detection performed on the first number of serving cells.

25 Claims, 6 Drawing Sheets

(51) Int. Cl.
| | |
|---|---|
| H04W 76/18 | (2018.01) |
| H04W 76/19 | (2018.01) |
| H04W 80/02 | (2009.01) |
| H04B 7/022 | (2017.01) |
| H04B 7/06 | (2006.01) |
| H04W 24/10 | (2009.01) |
| H04W 24/08 | (2009.01) |
| H04L 1/1607 | (2023.01) |

(52) U.S. Cl.
CPC ........... *H04W 76/18* (2018.02); *H04W 76/19* (2018.02); *H04W 80/02* (2013.01)

(58) Field of Classification Search
CPC . H04W 74/0833; H04W 76/18; H04W 76/19; H04W 80/02; H04W 24/10; H04W 24/08
See application file for complete search history.

(56) References Cited

U.S. PATENT DOCUMENTS

| | | | |
|---|---|---|---|
| 2019/0253941 | A1 | 8/2019 | Cirik et al. |
| 2019/0253986 | A1 | 8/2019 | Jeon et al. |
| 2019/0327769 | A1 | 10/2019 | Yang et al. |
| 2020/0113010 | A1 | 4/2020 | Wilson et al. |
| 2020/0350973 | A1 | 11/2020 | Cirik et al. |
| 2021/0067229 | A1* | 3/2021 | Ryu ..................... H04B 7/0695 |
| 2021/0105759 | A1 | 4/2021 | Bai et al. |
| 2021/0111780 | A1* | 4/2021 | Zhou .................... H04W 76/18 |
| 2021/0314218 | A1 | 10/2021 | Kang et al. |
| 2021/0321420 | A1 | 10/2021 | Islam et al. |
| 2021/0345454 | A1* | 11/2021 | Dhanapal .......... H04W 28/0268 |
| 2021/0367744 | A1 | 11/2021 | Wu et al. |
| 2022/0039077 | A1 | 2/2022 | Koskela et al. |
| 2022/0052749 | A1* | 2/2022 | Guo ..................... H04B 7/0695 |
| 2022/0053353 | A1 | 2/2022 | Lee et al. |
| 2022/0109489 | A1 | 4/2022 | Zhu et al. |
| 2022/0167197 | A1* | 5/2022 | Li ......................... H04W 24/10 |
| 2022/0210683 | A1 | 6/2022 | Li |
| 2022/0217588 | A1 | 7/2022 | You et al. |

FOREIGN PATENT DOCUMENTS

| | | |
|---|---|---|
| EP | 3 864 764 A1 | 8/2021 |
| EP | 3 962 152 A1 | 3/2022 |
| EP | 4 017 074 A1 | 6/2022 |
| EP | 4 035 473 A1 | 8/2022 |
| EP | 4 038 819 A1 | 8/2022 |
| WO | WO 2013/147505 A1 | 10/2013 |
| WO | WO 2016/018121 A1 | 2/2016 |
| WO | WO 2019/137472 A1 | 7/2019 |
| WO | WO 2020/032685 A1 | 2/2020 |
| WO | WO 2020/061955 A1 | 4/2020 |
| WO | WO 2020/063126 A1 | 4/2020 |
| WO | WO 2020/076462 A1 | 4/2020 |
| WO | WO 2020/215286 A1 | 10/2020 |
| WO | WO 2021/056285 A1 | 4/2021 |
| WO | WO 2021/067102 A1 | 4/2021 |
| WO | WO 2021/077342 A1 | 4/2021 |
| WO | WO 2021/168779 A1 | 9/2021 |
| WO | WO 2021/201524 A1 | 10/2021 |

OTHER PUBLICATIONS

Apple, "Report of [Post109e#17][EMIMO] BFR MAC CE for BFR on SpCell (Apple)", 3GPP TSG-RAN WG2 Meeting #109bis, R2-2002795, (Apr. 20-30, 2020), 24 pages.

Apple, "Summary of Offline #103: BFR on SpCell (2nd Round)", 3GPP TSG-RAN WG2 Meeting #109bis, R2-2003902, (Apr. 20-30, 2020), 11 pages.

Asia Pacific Telecom Co. Ltd, "Remaining Issues on SCell BFR Procedure", 3GPP TSG-RAN WG2 Meeting #109 electronic, R2-2001421, (Feb. 24-Mar. 6, 2020), 4 pages.

Ericsson et al., "BFC MAC CE for SpCell", 3GPP TSG-RAN WG2 #109 electronic, R2-2001652, (Feb. 24-Mar. 6, 2020), 4 pages.

International Search Report and Written Opinion for Patent Cooperation Treaty Application No. PCT/CN2020/083423 dated Dec. 28, 2020, 7 pages.

Nokia et al., "Bitmap Length Determination for BFC MAC CE", 3GPP TSG-RAN WG2 Meeting #109bis-e, R2-2003051, (Apr. 20-30, 2020), 3 pages.

Notice of Allowance for U.S. Appl. No. 17/216,935 dated Apr. 29, 2022.

Notice of Allowance for U.S. Appl. No. 17/216,935 dated Jul. 19, 2022.

Qualcomm Inc., "Remaining Issues in Scell BFR", 3GPP TSG-RAN WG2 Meeting #109 electronic, R2-2001484, (Feb. 24-Mar. 6, 2020), 7 pages.

Qualcomm Incorporated, "Procedure and Format for Beam Index Indication MAC CE", 3GPP TSG-RAN WG2 Meeting #107, R2-1911504, (Aug. 26-30, 2019), 4 pages.

Samsung, "Introduction of eMIMO for NR", 3GPP TSG-RAN WG2 Meeting #109 electronic, R2-2001897, (Feb. 24-Mar. 6, 2020), 59 pages.

Samsung, "Issues for Beam Failure Recovery", 3GPP TSG-RAN2 Meeting #109bis Electronic, R2-2002557, (Apr. 20-24, 2020), 7 pages.

Samsung, "Offline Discussion 112: Beam Management Enhancements", 3GPP TSG-RAN WG2 Meeting #109e, R2-2001678, (Mar. 24-Apr. 6, 2020), 19 pages.

Samsung, "Offline Discussion 112: Beam Management Enhancements", 3GPP TSG-RAN WG2 Meeting #109e, R2-2001685, (Mar. 24-Apr. 6, 2020), 12 pages.

Samsung, "Revised WID: Enhancements on MIMO for NR", 3GPP TSG RAN Meeting #82, RP-182863, (Dec. 10-13, 2018), 5 pages.

Samsung, "Summary of Email Discussion [108#70] [NR-eMIMO]: BFR MAC CE", 3GPP TSG-RAN WG2 Meeting #109, R2-2000227, (Feb. 24-28, 2020), 11 pages.

ZTE et al., "The Remaining Issues on Beam Failure Recovery on SpCell and SCell", 3GPP TSG-RAN WG2 e-Meeting #109, R2-2001509, (Feb. 2020), 11 pages.

ZTE et al., "The Remaining Issues on BFR on SCell", 3GPP TSG-RAN2 Meeting #108, R2-1916069, (Nov. 18-22, 2019), 4 pages.

ZTE, "Enhancements on Multi-Beam Operation", 3GPP TSG RAN WG1 Meeting #96bis, R1-1904014, (Apr. 8-12, 2019), 17 pages.

ZTE, "Enhancements on Multi-Beam Operation", 3GPP TSG RAN WG1 Meeting #98, R1-1908192, (Aug. 26-30, 2019), 26 pages.

Office Action for Australian Application No. 2020441580 dated Jun. 20, 2023, 2 pages.

First Examination Report for Indian Application No. 202227062595 dated Feb. 28, 2023, 6 pages.

Office Action for Japanese Application No. 2022-560990 dated Nov. 6, 2023, 9 pages.

Samsung, "Remaining Issues of Scell BFR", 3GPP TSG-RAN WG2 Meeting #109, R2-2000226, (Feb. 24-28, 2020), 3 pages.

Samsung, "Summary of Beam Management Enhancements", 3GPP TSG-RAN WG2 Meeting #109e, R2-2001672, (Mar. 24-Apr. 6, 2020), 5 pages.

* cited by examiner

REPORTING BEAM FAILURE

CROSS-REFERENCE TO RELATED APPLICATIONS

This application is a continuation of U.S. Non-Provisional patent application Ser. No. 17/216,935, filed Mar. 30, 2021 and entitled "Reporting Beam Failure," which is a National Stage Entry of International Application Serial No. PCT/CN2020/083423, filed Apr. 6, 2020 and entitled "Reporting Beam Failure," the entire disclosures of each of which are hereby incorporated herein by reference in their entireties for all purposes.

FIELD

Embodiments of the present disclosure generally relate to the field of telecommunication and in particular, to methods, devices, apparatuses and computer readable storage medium for reporting beam failure.

BACKGROUND

With development of communication systems, more and more technologies have been proposed. For example, a new radio access system, which is also called a NR system or NR network, is being developed. A carrier aggregation (CA) technology to increase the system bandwidth may be supported in the NR system. When CA is used, there may be a number of serving cells for a terminal device. Generally, a primary cell (PCell) and at least one secondary cell (SCell) are provided. A beam failure may occur on one or more of the serving cells for the terminal device when the quality of beam pair(s) of the one or more serving cells falls low enough, for example, by comparison with a threshold or time-out of an associated timer.

A beam failure recovery (BFR) procedure is a mechanism for recovering beams when all or part of beams serving a terminal device has failed. If the terminal device detects one or more beam failures on one or more corresponding serving cells, a BFR procedure is needed to recover from the beam failure. To implement the BFR procedure, the terminal device may report the detected beam failure(s) to the network device.

SUMMARY

In general, example embodiments of the present disclosure provide a solution for reporting beam failure. Embodiments that do not fall under the scope of the claims, if any, are to be interpreted as examples useful for understanding various embodiments of the disclosure.

In a first aspect, there is provided a terminal device. The terminal device comprises at least one processor; and at least one memory including computer program code; where the at least one memory and the computer program code are configured to, with the at least one processor, cause the terminal device to perform beam failure detection on a first number of serving cells configured for the terminal device; determine information to at least indicate respective results of the beam failure detection on a second number of serving cells among the first number of serving cells, the second number being smaller than the first number; and transmit the determined information to a network device serving the terminal device using a resource allocated for the terminal device.

In a second aspect, there is provided a network device. The network device comprises at least one processor; and at least one memory including computer program code; where the at least one memory and the computer program code are configured to, with the at least one processor, cause the network device to receive, from a terminal device, information at least indicating respective results of beam failure detection performed on a second number of serving cells; and in accordance with a determination that a first number of serving cells are configured with beam failure detection by the terminal device, determine, based on the received information, an overall result of the beam failure detection on the first number of serving cells, the second number being smaller than the first number.

In a third aspect, there is provided a method. The method comprises performing, at a terminal device, beam failure detection on a first number of serving cells configured for the terminal device; determining information to at least indicate respective results of the beam failure detection on a second number of serving cells among the first number of serving cells, the second number being smaller than the first number; and transmitting the determined information to a network device serving the terminal device using a resource allocated for the terminal device.

In a fourth aspect, there is provided a method. The method comprises receiving, at a network device and from a terminal device, information at least indicating respective results of beam failure detection performed on a second number of serving cells; and in accordance with a determination that a first number of serving cells are configured with beam failure detection by the terminal device, determining, based on the received information, an overall result of the beam failure detection on the first number of serving cells, the second number being smaller than the first number.

In a fifth aspect, there is provided a first apparatus. The first apparatus comprises means for: performing beam failure detection on a first number of serving cells configured for the first apparatus; determining information to at least indicate respective results of the beam failure detection on a second number of serving cells among the first number of serving cells, the second number being smaller than the first number; and transmitting the determined information to a second apparatus serving the first apparatus using a resource allocated for the first apparatus.

In a sixth aspect, there is provided a second apparatus. The second apparatus comprises means for: receiving, from a first apparatus, information at least indicating respective results of beam failure detection performed on a second number of serving cells; and in accordance with a determination that a first number of serving cells are configured with beam failure detection by the first apparatus, determining, based on the received information, an overall result of the beam failure detection on the first number of serving cells, the second number being smaller than the first number.

In a seventh aspect, there is provided a computer readable medium. The computer readable medium comprises program instructions for causing an apparatus to perform at least the method according to the third aspect.

In an eighth aspect, there is provided a computer readable medium. The computer readable medium comprises program instructions for causing an apparatus to perform at least the method according to the fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
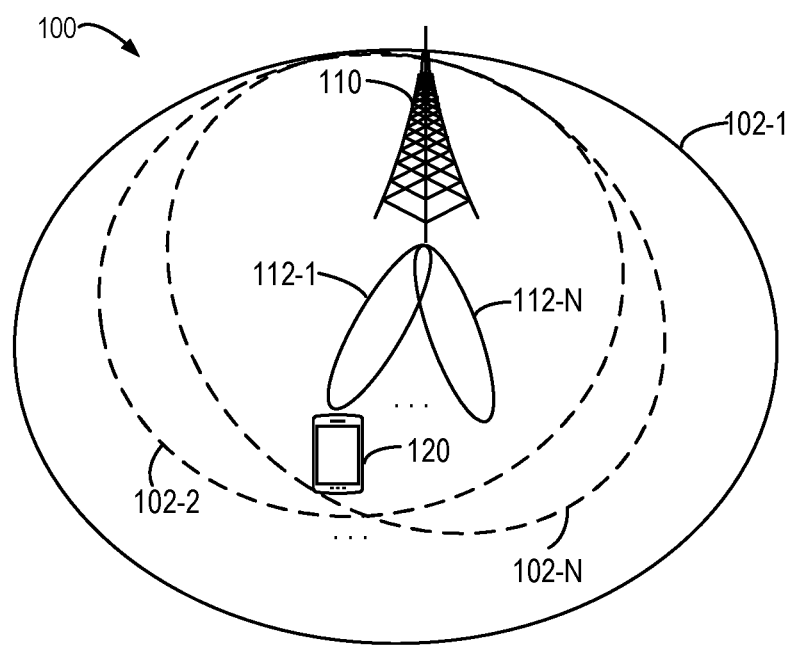
FIG. 1 illustrates an example communication environment in which example embodiments of the present disclosure can be implemented.

Principles of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, a resource in both frequency domain and time domain will be used as an example of a transmission resource for describing some example embodiments of the present disclosure. It is noted that example embodiments of the present disclosure are equally applicable to other resources in other domains.

FIG. 1 shows an example communication environment 100 in which example embodiments of the present disclosure can be implemented. The communication environment 100 includes a network device 110 and a terminal device 120 served by the network device 110. The network device 110 may configure N serving cells 102-1, 102-2, . . . , 102-N to serve the terminal device 120, where N is an integer larger than one. For purpose of discussions, the serving cells 102-1, 102-2, . . . , 102-N are collectively or individually referred to as serving cells 102.

It is to be understood that the number of network devices, terminal devices and serving cells is only for the purpose of illustration without suggesting any limitations. The communication environment 100 may include any suitable number of network devices, terminal devices and serving cells adapted for implementing embodiments of the present disclosure. It is to be noted that the term "cell" and "serving cell" can be used interchangeably herein.

In operation, the network device 110 can communicate data and control information to the terminal device 120 and the terminal device 120 can also communication data and control information to the network device 110. A link from the network device 110 to the terminal device 120 is referred to as a downlink (DL) or a forward link, while a link from the terminal device 120 to the network device 110 is referred to as an uplink (UL) or a reverse link.

Communications in the communication environment 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

CA can be supported in the environment 100. According to the CA technology, two or more component carriers (CCs) are aggregated in order to support a broader bandwidth. With the CA supported, the network device 110 may provide to the terminal device 120 a plurality of serving cells, including a Pcell and one or more SCells. For example, in the shown environment 100 of FIG. 1, the serving cell 102-1 is a PCell for the terminal device 120, and the serving cells 102-2, . . . , 102-N are SCells. Although two SCells 102-2, 102-N are specifically depicted in FIG. 1, the network device 110 may provide less or more SCells. It is also to be understood that the configuration of the PCell 102-1 and SCells 102-2, 102-N shown in FIG. 1 is only for the purpose of illustration without suggesting any limitations. PCell 102-1 and SCells 102-2, 102-N may be in other configuration than that shown in FIG. 1.

Although one network device 110 is shown, in some example embodiments, the environment 100 may comprise a further network device (not shown), which may employ the same or a different radio access technology with the network device 110 to serve for the terminal device 120. The terminal device 120 may be in dual connection (DC) with two or more network devices 110. In such case, the plurality of serving cells 102 for the terminal device 120 may be divided into two or more groups, for example, a master cell group (MCG) and a secondary cell group (SCG), each provided by one network device. In some example embodiments, a primary secondary cell (PSCell) among all the Scells may be configured for the terminal device 120. The PCell or the PSCell may sometimes be referred to as a special cell (SpCell).

The network device 110 may be configured to implement beamforming technique and transmit signals to the terminal device 120 via a plurality of beams. The terminal device 120 is configured to receive the signals transmitted by the network device 110 via the plurality of beams. There may be different beams configured for the PCell 102-1 and the SCells 102-2, 102N. As shown in FIG. 1, beams 112-1-1 and 112-2 are configured for the SCells 102-2 and 102-N, respectively. It is to be understood that the SCells 102-2 and 102-N may have more beams associated therewith. Although not shown, the PCell 102-1 may also have one or more beams associated therewith. The beams may be collectively or individually referred to as beams 112, for the purpose of discussion.

In operation, a terminal device may be configured to detect whether a beam failure occurs on any of the serving cells. As mentioned above, when a beam failure is detected on any of the serving cells, a BFR procedure is needed to recover from the beam failure. To implement the BFR procedure, the terminal device may report the detected beam failure(s) to the network device so as to request a beam failure recovery.

Currently BFR has been defined for one serving cell, which in practice covers BFR for SpCell (PCell or PSCell) only. Thus, there still remains a need to provide a solution for BFR covering the SCell(s). It is proposed to implement BFR for the SCell(s) (also referred to as SCell BFR) using a medium access control (MAC) control element (CE). For example, the terminal device may transmit to the network device a MAC CE that indicates a cell index/indices of a SCell(s) on which a beam failure is detected. For each SCell with the beam failure detected, the MAC CE may also comprise an indication to indicate if a suitable candidate beam has been detected for the SCell and an index of the candidate beam if available. The MAC CE for BFR may also be referred to as a BFR MAC CE.

Transmission of the MAC CE may be preceded by a transmission of a dedicated scheduling request (SR) signal that indicates a beam failure event. Alternatively, the MAC CE may also be multiplexed to any UL grant of the terminal device. For example, if a beam failure occurs in a SpCell, such as a PCell or a PSCell, the terminal device may include an indication of the beam failure, for example, into message 3 (also referred to as Msg3) or massage A (also referred to as MsgA) during a RA procedure, although one or more SCells are detected to be in failure as well. The BFR MAC CE may include a bitmap, each bit of which indicates whether a beam failure is detected or not on a serving cell. The MAC CE may further include an indication(s) of the candidate beam(s) for one or more serving cells in failure, if any, although such indication(s) may be omitted.

In some cases, a relatively large number of serving cells for the terminal device may be configured with beam failure detection. Accordingly, the amount of information to specifically report the beam failure detected may be relatively large. For example, a size of the bitmap for the BFR MAC CE may be determined based on the highest number of the serving cells configured with beam failure detection. Currently there are two variable sizes for the bitmap, one including a single octet and the other one including four octets. Current formats for reporting the information concerning the beam failure detection are briefly introduced with reference to FIGS. 3A and 3B. In these examples, the information is transmitted in a MAC CE. Such MAC CE may be referred to as BFR MAC CE.

Figure 2A:
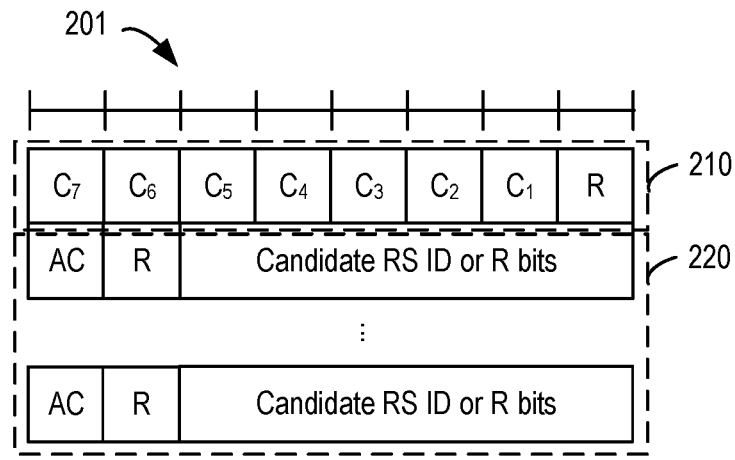
FIGS. 2A and 2B illustrates example formats for reporting information concerning beam failure detection.

FIG. 2A shows a schematic diagram illustrating an example format 201 for the information concerning the beam failure detection. As shown, the example format 201 comprises a one-octet bitmap 210. Each Ci field (i=1, 2, . . . , 7) in the bitmap 210 may include one bit corresponding to a serving cell with a cell index i, used to indicate a result of beam failure detection on that serving cell. For example, if a beam failure is detected on the serving cell with a cell index i, the bit Ci is set to 1. Otherwise, if the beam failure is not detected, the bit Ci is set to 0. Of source, the values of the bits may be set as vice versa to indicate the results of the beam failure detection.

In some cases, the R bit in the bitmap 210 may be a reserved bit which may be set to a predetermined value such as 0. In some example embodiments, the R bit in the bitmap 210 may be corresponding to a SpCell, for example, the PCell or the PSCell, used to indicate a result of the beam failure detection on the SpCell. For example, if a beam failure is detected on the SpCell, the R bit in the bitmap 210 may be set to 1; otherwise, the R bit may be set to 0.

The format 201 may further comprise a part 220 to indicate one or more candidate beam for one or more serving cells in a failure condition. In an example, the part 220 may include a number of octets each corresponding to one of the serving cells configured. Specifically, if a beam failure is detected on a serving cell and the serving cell has a candidate beam, an availability indication (AC) field (which may include one bit) in the part 220 may be present and set to 1. A following field in the same octet is used to indicate an identity of a candidate reference signal (candidate RS ID) corresponding to a candidate beam of the serving cell in a failure condition. In some cases, if the AC field is present, the following bits may be reserved bits (R bits).

In some example embodiments, for each serving cell detected to be in a failure condition, an octet containing the AC field may be included in the part 220 of the format 201. In such an example, a BFR MAC CE in this format 201 may be referred to as non-truncated BFR MAC CE or non-truncated SCell BFR MAC CE (if the information concerning the SCells is included). The octets in the part 220 may be included in an ascending order based on the cell indices of the serving cells.

In some other example embodiments, if a serving cell is detected to be in a failure condition, the octet containing the AC field may not be included in the part 220. In such an example, a BFR MAC CE in this format 201 may be referred to as truncated BFR MAC CE or truncated SCell BFR MAC CE (if the information concerning the SCells is included). The number of octets containing the AC field included may be maximized while not exceeding the available grant size of resource. In some examples, the number of the octets containing the AC field in the truncated BFR format can be zero.

Figure 2B:
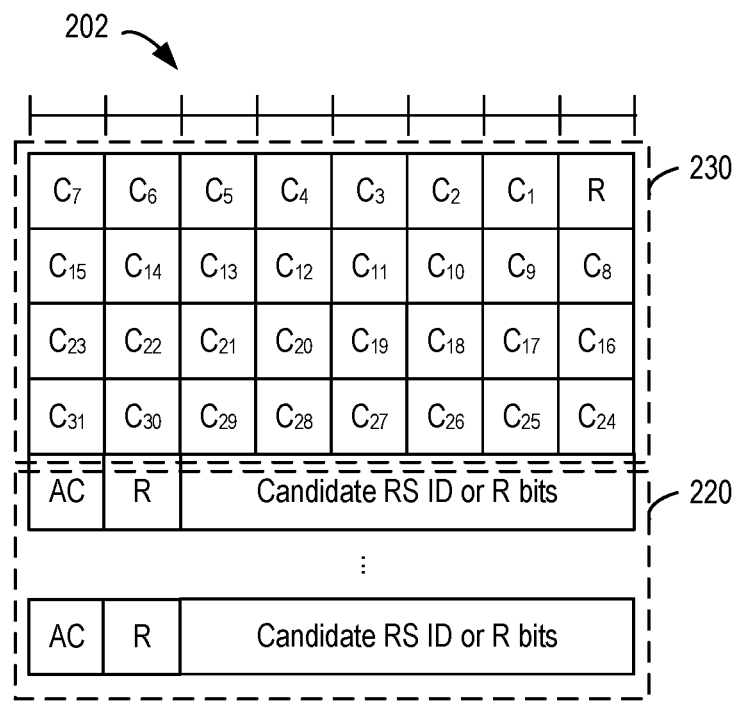

It is noted that the format 201 can be used to report the respective results of the beam failure detection on up to seven SCells or eight serving cells (including seven SCells and one SpCell). In some example embodiments, if more than seven SCells are configured with beam failure detection, an example format 202 shown in FIG. 2B may be used to report the information concerning the beam failure detection. In this shown example, the format 202 include a four-octet bitmap 230 to indicate respective results of beam failure detections on up to thirty-two serving cells, where each Ci (i=1, 2, . . . , 31) field in the bitmap 230 may include one bit corresponding to a serving cell with a cell index i, used to indicate a result of beam failure detection on that serving cell. The part 220 included in the format 202 is the same as the format 201 in FIG. 2A.

Conventionally, the format 201 or 202 is selected based on the number of serving cells configured for the beam failure detection. If the number of serving cells configured with beam failure detection is less than 8, the bitmap including a single octet is used; otherwise, if the number is larger than or equal to 8, the bitmap including four octets is used.

However, the resource granted for the terminal device to transmit information on the beam failure detection is usually limited and may not be sufficient to carry all information required to be reported, e.g. UL grant is too small. UL grant has limited amount of free payload bits after other higher priority information has been included. For example, MAC CE is reported in message 3 (Msg3) of the RA procedure (e.g., in case the SpCell has failed or when there is no dedicated SR to request UL grant) in which case the usual minimum size of Msg3 is 7 bytes out of which 3 bytes are occupied by the Cell-Radio Network Temporary Identifier (C-RNTI) MAC CE. However, the BFR MAC CE may take a minimum size of 6 bytes (including a 2-byte sub-header and a 4-byte bitmap) in some cases. Therefore, there is a need for a solution to always enable reporting of the beam failure.

According to some example embodiments of the present disclosure, there is provided a solution for reporting beam failure of serving cells, and in particular for reporting beam failure of SCells and/or PCell/PSCell to enable BFR. According to this solution, a terminal device performs beam failure detection on a number of configured serving cells and determines to report to a network device a result of the beam failure detection. Among all the serving cells, the terminal device determines information concerning respective results of beam failure detection on some but not all of the serving cells. The determined information is transmitted to a corresponding network device using a resource allocated for the terminal device. Through this solution, the terminal device may be configured to signal information for BFR in a specific optimized manner by reducing the amount of information to be transmitted as well as enabling the network device to be informed of the BFR required by the terminal device. This solution is highly beneficial if the resource allocated for the BFR report is insufficient and/or if overhead reduction is required.

Example embodiments of the present disclosure will be described in detail below with reference to the accompanying drawings.

Figure 3:
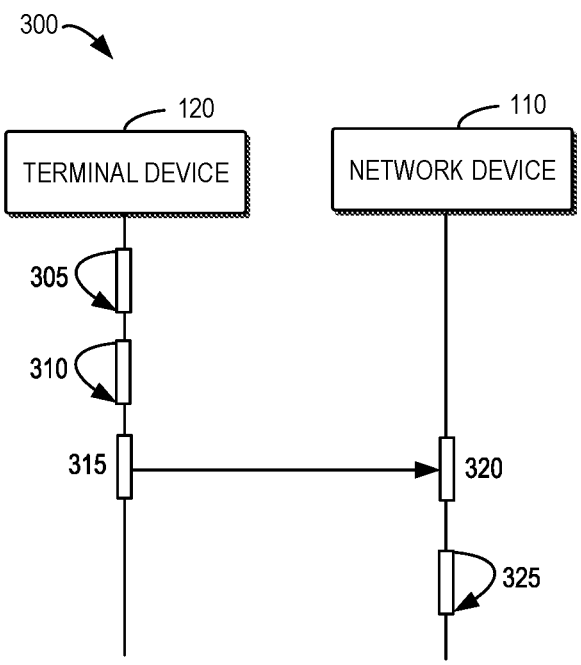
FIG. 3 illustrates a signaling flow for reporting beam failure according to some example embodiments of the present disclosure.

Reference is now made to FIG. 3, which shows a signaling flow 300 for reporting beam failure according to some example embodiments of the present disclosure. For the purpose of discussion, the signaling flow 300 will be described with reference to FIG. 1. The signaling flow 300 involves the network device 110 and the terminal device 120 in FIG. 1.

In operation, the terminal device 120 performs 305 beam failure detection on a number of configured serving cells 102 (referred to as a "first number of serving cells 102" for ease of discussion), in order to detect whether a beam failure occurs on any of the serving cells 102. The serving cells 102 may include, for example, a Pcell, a PSCell, and/or one or more SCells. The first number of serving cells 102 may include those configured by the network device 110 with the beam failure detection.

The beam failure detection may be performed through various techniques. For example, for each serving cell, the terminal device 120 may detect the beam failure by determining a hypothetical physical downlink control channel (PDCCH) error rate (e.g. PDCCH block error rate, BLER) estimated on one or more beams of the serving cell and comparing the error rate with a threshold. Any other beam failure detection methods can also be employed by the terminal device 120.

With the beam failure detection performed, the terminal device 120 may decide to report information concerning the beam failure detection to a network device 110 associated with the serving cell(s) 102. In some example embodiments, if one or more beam failures are detected on one or more of the first number of serving cells 102, the terminal device 120 may determine to trigger a BFR and thus information concerning the beam failure detection is to be reported to the network device 110. Generally, it is desired to report to the network device 110 respective results of the beam failure detection on the detected serving cells 102 and possible candidate beams for the serving cells 102 in a failure condition, using for example, the format 201 or 202. However, in some cases, the resource available for transmission of information concerning the beam failure detection may not be sufficient, and/or the terminal device 120 finds that it is not necessary to use a large overhead size to report the information concerning all the results of the beam failure detection. Accordingly, in example embodiments of the present disclosure, the terminal device 120 is allowed to report partial information concerning the beam failure detection.

Specifically, in the signaling flow 300, the terminal device 120 determines 310 information to at least indicate respective results of the beam failure detection on a second number of serving cells among the first number of serving cells 102, and transmits 315 the determined information to the network device 110 using a resource allocated for the terminal device 120. The second number is smaller than the first number here. That is to say, the terminal device 120 can determine and transmit information concerning the beam failure detection on some but not all of the configured serving cells, so as to reduce the amount of information to be reported to the network device 110 in case of BFR. The second number may be predetermined as any number smaller than the total number of the configured serving cells 102. The specific number of serving cells with the respective results of beam failure detection reported will be discussed in detail below.

In some example embodiments, the information indicating respective results of the beam failure detection on a second number of serving cells may comprise respective indications of whether beam failures are detected or not on the second number of serving cells. The information transmitted to the network device 110 is to trigger a BFR procedure between the network device 110 and the terminal device 120. Thus, such information may also be referred to as BFR related information.

In some example embodiments, if the terminal device 120 determines that the allocated resource is insufficient for transmission of information indicating respective results of the beam failure detection on all the first number of serving cells 102, it may determine information indicating the respective results of the beam failure detection on the second number but not all the first number of serving cells 102. In some example embodiments, if it is possible to reduce the overhead in transmission of the information concerning the beam failure detection, the terminal device 120 may determine to not report the results of the beam failure detections on all the first number of serving cells 102.

Alternatively, or in addition, if the information concerning the beam failure detection is to be transmitted to the network device 110 in a message of a random access (RA) procedure, especially in a message of a contention-based RA (CBRA) procedure, the terminal device 120 may determine to transmit information concerning only some of the first number of serving cells 102. The message used to convey the information concerning the beam failure detection may be, for example, Msg3 of a 4-step RA procedure or MsgA of a 2-step RA procedure. Generally, the resource allocated to the terminal device 120 for transmission of the message in a RA procedure may be limited and thus the reduced information may be advantageous.

Alternatively, or in addition, if a beam failure is detected on a predetermined cell among all the first number of configured serving cells 102, the terminal device 120 may determine to transmit information concerning only some of the first number of serving cells 102. The predetermined cell may be, for example, a SpCell such as a PCell or a PScell. In some examples, the terminal device 120 may be configured in such a way that it may initiate a RA procedure if a beam failure is detected on a SpCell. In such a case, the reduced amount of information to be transmitted is desired considering the limited allocated resource.

It has been discussed above some example scenarios in which the reduced information is transmitted by the terminal device 120. It would be appreciated that the terminal device 120 may be configured to transmit information concerning only some of the first number of serving cells 102 in any other possible scenarios.

At the network device side, the network device 110 receives 320 the information at least indicating respective results of beam failure detection performed on the second number of serving cells. In the embodiments of the present disclosure, although only the information concerning some but not all of the first number of serving cells 102 is received from the terminal device 120, the network device 110 is able to determine 325, based on the received information, an overall result of the beam failure detection on the first number of serving cells 102. The overall result may be incomplete, but can still facilitate the BFR procedure between the terminal device 120 and the network device 110. Depending on the specific information determined and transmitted from the terminal device 120, the network device 110 may be informed of different results of the beam failure detection on the serving cells 102.

The information determined and transmitted by the terminal device 120 will be discussed in detail below.

In some example embodiments, if the respective results of the beam failure detection on the first number of serving cells 102 are expected to be indicated by all the first number of bits in a bitmap corresponding to the first number of serving cells 102, the terminal device 120 may determine only a predetermined part of the bitmap corresponding to the second number of serving cells and transmit the determined part of the bitmap, without transmitting the remaining part of the bitmap to the network device 110. To enable the network device 110 to identify the results of the beam failure detection on the second number of serving cells, the terminal device 120 may be configured to transmit only a part of the bitmap to report using the currently allocated resource.

The bitmap expected to indicate the respective results of the beam failure detection on the first number of serving cells 102 may be expected to be included in a MAC CE (or a BFR MAC CE). For example, the expected bitmap may be similar to the bitmap 230 in FIG. 2B. In this example, the terminal device 120 may be configured with a maximum number of 32 serving cells. In some other examples, the bitmap may include more or less bits corresponding to a different number of serving cells. That is, the first number may be smaller than or larger than 32. In some other example embodiments, the expected bitmap may be similar to the bitmap 230 in FIG. 2B even if the number of serving cells configured for the terminal device 120 is less than 32, i.e., in case the number of serving cells configured for the terminal device is above 8.

Figure 4A:
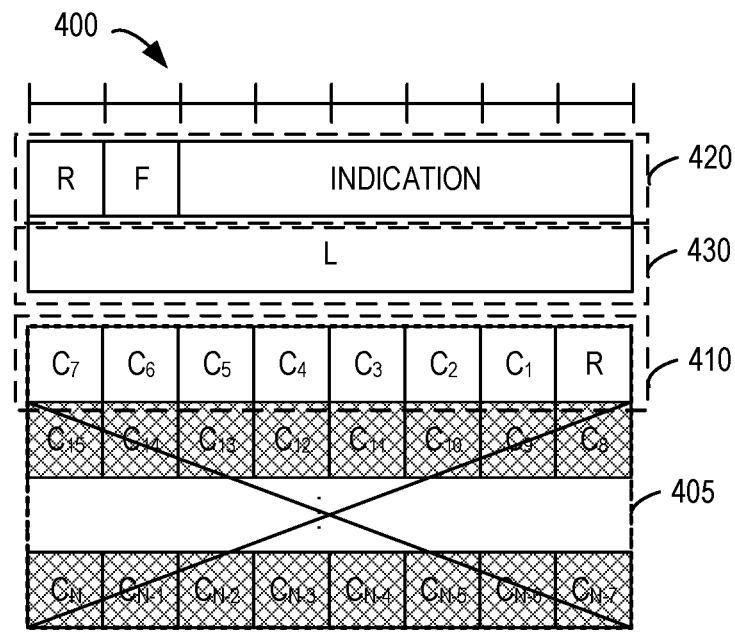
FIGS. 4A and 4B illustrates example formats for reporting information concerning beam failure detection according to some example embodiments of the present disclosure.

FIG. 4A shows an example format 400 used to report information indicating at least some of the configured serving cells according to some example embodiments of the present disclosure. In this example, the beam failure detection on the first number of serving cells 102 are expected to be reported using a bitmap 405 including N bits, where N is equal to the first number. In some example embodiments, the terminal device 120 may determine and transmit only a part 410 in the expected bitmap 405, for example, the first octet in the example shown in FIG. 4A. The part 410 may correspond to some of all the N serving cells, and each bit in the part 410 may be assigned with a predetermined value (0 or 1) to indicate a result of the beam failure detection on the corresponding serving cell. For example, if the bit Ci (i=1, 2, . . . , 7) of the first octet may be corresponding to the seven serving cells, such as seven SCells. In some examples, the R bit in the first octet may be corresponding to a SpCell of the terminal device 120 and thus the first octet may also be included in the information transmitted to the network device 110.

The first number (N) of serving cells 102 may be identified by respective cell indices. In some example embodiments, the first number of serving cells 102 are corresponding to the first number of bits in the bitmap 405 in a specific order of cell indices, such as in an ascending order or a descending order. For example, the serving cells may be indexed with cell indices of 1 through 31 (or 0 through 31 if the R bit is involved). The serving cell with a cell index of "1" is corresponding to the first bit of the first octet in the bitmap 405; the serving cell with the cell index of "2" is corresponding to the second bit of the first octet in the bitmap 405; and so on. The correspondence between the serving cells and the bits in the bitmap 405 are known to both the terminal device 120 and the network device 110. As such, when the part of the bitmap 405 is transmitted to the network device 110, the network device 110 can be aware of the explicit results of the beam failure of the second number of serving cells (for example, the first eight cells). In some examples, a continuous part of the bitmap 405 may be determined for transmission.

Although the first octet is illustrated in FIG. 4A as an example, the terminal device 120 may determine any part of the bitmap 405 corresponding to any number of serving cells 102 to transmit to the network device 110, as long as the part of the bitmap 405 to be reported is known by both the terminal device 120 and the network device 110. For example, if the total bitmap corresponding to the first number (N) of the serving cells 102 includes four octets, the first and second octets, the first and third octets, or the second, third, and fourth octets may be assigned with values indicating the results of the beam failure detection on the corresponding cells. In some examples, the terminal device 120 may include as many octets of the bitmap as the available resources can accommodate, that is, the terminal device 120 may also include the first 2 or 3 octets of the bitmap instead of including only the first octet if the available resources granted to the terminal device 120 can accommodate two-octet or three-octet bitmap. It would be appreciated that although a four-octet bitmap 405 is described, the first number of serving cells 102 may be any other number larger than or smaller than 31, and accordingly the expected bitmap may have any other size. The scope of the present disclosure is not limited in this regard.

In addition to the part of the bitmap used to indicate respective results of the second number of serving cells, the terminal device 120 may further determine an indication that further information concerning the beam failure detection on the first number of serving cells 102 is to be conveyed to the network device 110. For ease of discussion, such an indication is referred to as a first indication. The first indication may also be included in the information transmitted 215 to the network device 110 using the allocated resource. As the network device 110 knows that the first number of serving cells 102 are configured with beam failure detection, with the first indication indicated, the network device 110 may further determine that one or more beam failures may have been potentially detected on one or more other serving cells except for those with the results reported.

In some example embodiments, the part of the bitmap transmitted may be included in a payload portion of an information element (IE), for example, in a payload portion of the MAC CE, while the first indication may be included in a header portion of the IE. FIG. 4A further shows a header portion in the format 400, including a first part 420 with an indication field to include the first indication and a second part 430 with a length (represented as "L") field to indicate the length of the payload portion, for example, the part 410 of the bitmap 405.

In an example embodiment where the information is transmitted in a BFR MAC CE, the indication field in the first part 420 of the header portion (also referred to as a sub-header of the BFR MAC CE) may be a logical channel identity (LCID) field which is used to identify the type of the BFR MAC CE. The LCID field may be set as one of a list of predetermined values. The list of predetermined values may include a value indicating that the BFR MAC CE is truncated, which implies that the terminal device 120 has more information on the beam failure detection on the first number of serving cells 102 to be reported. The list of predetermined values may include a value indicating that the BFR MAC CE is non-truncated, which implies that no further information concerning the beam failure detection on the first number of serving cells 102 is to be conveyed to the network device. In the example embodiments where only a part of the bitmap 405 is transmitted to the network device 110, the indication field in the part 410 of the header portion may be set as a value indicating a truncated BFR MAC CE.

In some examples, if the bitmap has a variable size (for example, either one octet or four octets), the list of predetermined values may include four possible values to indicate different types of BFR MAC CE, including a value indicating a truncated BFR MAC CE with one-octet bitmap (for example, a value of "51"), a truncated BFR MAC CE with four-octet bitmap (for example, a value of "50"), a non-truncated BFR MAC CE with one-octet bitmap (for example a value of "49"), and a non-truncated BFR MAC CE with fourth octet bitmap (for example, a value of "48"). Of source, those are merely some possible values used to indicate to the network device 110 whether there is further information concerning the beam failure detection to be conveyed to the network device 110.

In addition to reuse the LCID field in the header portion to carry the first indication, in some other example embodiments, other type of field may also be included to carry the first indication. In some examples, as shown, the first part 420 in the header portion may further include a format (represented as "F") field to indicate the size of the L field. For example, the size of the F field may be one bit, where the value of "0" indicates 8 bits of the L field and the value of "1" indicates 16 bits of the L field. The first part 420 may also include an R field indicating a reserved bit(s).

With the part of the bitmap and probably the first indication to be transmitted, the network device 110 may deduce an overall result of the beam failure detection at the terminal device 120 although not all the individual results of the first number of configured serving cells are indicated. For example, if the trigger to report the truncated BFR MAC CE is a beam failure detected on the predetermined cell (such as the SpCell), the network device 110 may determine that the predetermined cell has a beam failure although this result is not explicitly indicated in the part of the bitmap. As an alternative, the predetermined cell may be always included in the second number of serving cells to enable the network device 110 to be aware of whether this cell has a beam failure or not.

In some example embodiments, in addition to always including a certain part of the bitmap to indicate the respective results of some but not all of the first number of serving cells 102, the terminal device 120 may determine to transmit the part of the bitmap if all the serving cells on which beam failures are detected are corresponding to that part of the bitmap. This is because the BFR is required when a beam failure has been detected and thus the network device 110 is more care about the serving cells with the beam failures detected. In this way, it is possible to achieve overhead reduction in transmission of the information concerning the beam failure detection.

Specifically, if one or more beam failures are detected on one or more of the first number of serving cells 102, the terminal device 120 may determine whether the one or more bits in the expected bitmap corresponding to the serving cell(s) in a failure condition are all included in a continuous part of the bitmap. This continuous part may be preconfigured, for example, to be the first octet of the bitmap, the first two octets of the bitmap, or any other part of the bitmap. As the first number of serving cells 102 are corresponding to the first number of bits in the expected bitmap in either an ascending or descending order of cell indices of the serving cells 102, the terminal device 120 may determine whether the one or more serving cells in a failure condition are all corresponding to one continuous part of the bitmap based on their cell indices.

In some examples, if the first number of serving cells 102 are sorted in an ascending order of cell indices to correspond to the first number of bits in the bitmap, the terminal device 120 may determine the highest cell index among all the serving cell(s) in the failure condition. If the highest cell index is corresponding to a bit included in the predetermined continuous part of the bitmap, the terminal device 120 may then determine that all the other serving cell(s) in the failure condition are corresponding to the bits in that part of the bitmap. If the first number of serving cells 102 are sorted in an descending order of cell indices, the terminal device 120 may also be able to make the decision.

If it is determined that only a part of the bitmap can be used to indicate the beam failure(s) detected on the one or more serving cells, the terminal device 120 may determine and transmit only that part of the bitmap and omit the remaining part of the bitmap. Still using the format 400 in FIG. 4A as an example, if the terminal device 120 finds that one or more beam failures are detected on the serving cell(s) corresponding to the bits in the first octet in the part 410, for example, the highest cell index of the serving cell(s) in the failure condition is smaller than 8, the terminal device 120 may determine that the first octet is sufficient to indicate all the serving cell(s) in the failure condition to the network device 110. Accordingly, only the first octet of the bitmap 405 is determined and reported to the network device 110.

Figure 4B:
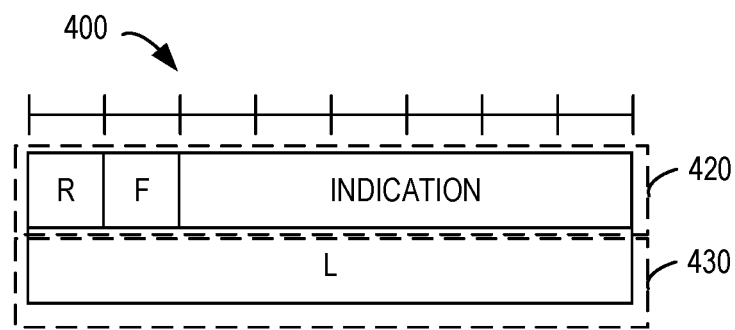

As the serving cell(s) with the beam failure(s) detected have all been reported to the network device 110, information indicating the results of remaining serving cells among the first number of serving cells 102 is not needed to be reported because the results all indicate no beam failure detected. Therefore, the terminal device 120 may further determine an indication that no further information concerning the beam failure detection on the first number of serving cells 102 is to be conveyed to the network device 110. For ease of discussion, such an indication is referred to as a second indication. The second indication may also be included in the information transmitted 215 to the network device 110 using the allocated resource. In some example embodiments, similar to the first indication, the second indication may be included in the header portion of the IE transmitted to the network device 110. In an example, the second indication may be included in the indication field in the part 410 as shown in FIG. 4B, such as the LCD field. In some example embodiments, the indication field in the part 410 may be set to a value indicating a non-truncated BFR MAC CE, which can imply that no further information is needed.

Within the header portion, the terminal device 120 may assign a predetermined field of the header portion with a predetermined value to indicate that the beam failure is detected on the predetermined cell. FIG. 4B shows another example format 400 which includes the header portion to report the beam failure according to some example embodiments of the present disclosure. The terminal device 120 may be configured to use the L field in the second part 430 to indicate that the beam failure is detected on the predetermined cell. For example, the L field in the second part 430 may be set to a zero-valued byte, which indicates that the length of the payload portion is zero and thus also implicitly indicates that the beam failure is detected on the predetermined cell.

In some example embodiments, in addition to the indication that the beam failure is detected on the predetermined cell, if a beam failure is detected on only the predetermined cell and all the remaining cells among the first number of serving cells 102 have no beam failure occurred, the terminal device 120 may include into the header portion the second indication discussed above, so as to indicate that no further information concerning the beam failure detection on the first number of serving cells 102 is to be conveyed to the network device 110. For example, the indication field in the first part 420 of FIG. 4B may be set to a value indicating a non-truncated BFR MAC CE. If a further beam failure is detected on at least one further serving cell of the first number of serving cells 102, the terminal device 120 may include into the header portion the first indication to indicate that further information concerning the beam failure detection on the first number of serving cells 102 is to be conveyed to the network device 110. For example, the indication field in the first part 420 of FIG. 4B may be set to a value indicating a truncated BFR MAC CE. Therefore, even if only a header portion is received from the terminal device 120, the network device 110 may deduce from the received information whether the predetermined cell is in the failure condition, and whether one or more other serving cells are in the failure condition.

The determination of the information concerning the beam failure detection on some but not all of the first number of serving cells 102 has been discussed above. In some example, the determination of the information may be performed in a MAC entity of the terminal device 120.

In some examples, the determination of the switch between the first and second RA types according to some example embodiments of the present disclosure may be performed in a MAC entity of the first device 110. The corresponding operations may be summarized in statements in Table 1 as below.

TABLE 1

5.17 Beam Failure Detection and Recovery procedure
The MAC entity shall:
  1>if the Beam Failure Recovery procedure determines that at least one BFR has been triggered and not cancelled:
    2>if UL-SCH resources are available for a new transmission:
      3>if the UL-SCH resources can accommodate the SCell BFR MAC CE plus its subheader as a result of logical channel prioritization:
        4>instruct the Multiplying and Assembly procedure to generate the SCell BFR MAC CE.
      3>else if the UL-SCH resources can accommodate the truncated SCell BFR MAC CE plus its subheader as a result of logical channel prioritization:
        4>instruct the Multiplexing and Assembly procedure to generate the truncated SCell BFR MAC CE.
      3>else if BFR has been triggered and not cancelled for SpCell and the UL-SCH resources can accommodate the truncated SCell BFR MAC CE with a single octet bitmap plus its subheader as a result of logical channel prioritization:
        4>instruct the Multiplexing and Assembly procedure to generate the truncated SCell BFR MAC CE.
    2>else:
      3>trigger the Scheduling Request for SCell beam failure recovery.
6.1.3.XX BFR MAC CEs
The BFR MAC CEs consists of either:
  - SCell BFR MAC CE; or
  - Truncated SCell BFR MAC CE.
The BFR MAC CEs are identified by a MAC subheader with LCID as specified in Table 6.2.1-2.
BFR MAC CE has a variable size. It includes a bitmap and in ascending order based on the ServCellIndex, beam failure recovery information i.e. octets containing candidate beam availabilty indication (AC) for SCells indicated in the bitmap. Except for Truncated SCell BFR MAC CE, a single octet bitmap is used when the highest ServCellIndex of this MAC entity's SCell configured with beam failure detection and with beam failure detected (as specified in Clause 5.17) is less than 8, otherwise four octets are used.

TABLE 1-continued

For Truncated SCell BFR MAC CE, a single octet bitmap is used with the following cases, otherwise four octets are used:
 - the highest ServCellIndex of this MAC entity's SCell configured with beam failure detection is less than 8; or
 - beam failure is detected for SpCell (as specified in Clause 5.17) and the UL-SCH resources available for transmission cannot accommodate the Truncated SCell BFR MAC CE plus its subheader as a result of logical channel prioritization.
The bitmap can be omitted in the SCell BFR format to indicate SpCell beam failure only.
The fields in the BFR MAC CEs are defined as follows:
 - $C_i$ (SCell BFR MAC CE): This field indicates beam failure detection (as specified in clause 5.17) and the presence of an octet containing the AC field for the SCell with ServCellIndex i as specified in TS 38.331 [5]. If the $C_i$ field set to 1, beam failure is detected and the octet containing the AC field is present for the SCell with SerCellIndex i. If the $C_i$ field set to 0, the beam failure is not detected octet containing the AC field is not present for the SCell with ServCellIndex i. The octets containing the AC field are present in ascending order based on the ServCellIndex;
 - $C_i$ (Truncated SCell BFR MAC CE): This field indicates beam failure detection (as specified in clause 5.17) for the SCell with ServCellIndex i as specified in TS 38.331 [5]. If the $C_i$ field set to 1, beam failure is detected and the octet containing the AC field for the SCell with ServCellIndex i may be present. If the $C_i$ field set to 0, the beam failure is not detected and the octet containing the AC field is not present for the SCell with ServCellIndex i. The octets containing the AC field, if present, are incuded in ascending order based on the ServCellIndex. The number of octets containing the AC field included is maximised, while not exceeding the available grant size;
NOTE: The number of the octets containing the AC field in the Truncated SCell BFR format can be zero.
- AC: This field indicates the presence of the Candidate RS ID field in this octet. If at least one of the SSBs with SS-RSRP above rsrp-thresholdBFR amongst the SSBs in candidateBeamRSSCellList or the CSI-RSs with CSI-RSRP above rsrp-ThresholdBFR amongst the CSI-RSs in candidateBeamRSSCellList is available, the AC field is set to 1; otherwise, it is set to 0. If the AC field set to 1, the Candidate RS ID field is present. If the AC field set to 0, R bits are present instead;
- Candidate RS ID: This field is set to the index of an SSB with SS-RSRP above rsrp-ThresholdBFR amongst the SSBs in candidateBeamRSSCellList or to the index of a CSI-RS with CSI-RSRP above rsrp-ThresholdBFR amongst the CSI-RSs in candidateBeamRSSCellList. The length of this field is 6 bits.
- R: Reserved bit, set to 0;
. . .

In some example embodiments, the terminal device 120 may need to evaluate the potential size of the MAC CE (or BFR MAC CE). In some examples, if the terminal device 120 selects between Random Access Preambles group A and B for CBRA, it needs to evaluate the potential size of the MAC CEs it is about to transmit along the MsgA or Msg3. More specifically, the terminal device 120 may need to evaluate if the potential Msg3 size (UL data available for transmission plus MAC header and, where required, MAC CEs) is greater than ra-Msg3SizeGroupA and the pathloss is less than a parameter "PCMAX" (of the Serving Cell performing the Random Access Procedure)—preambleReceivedTargetPower—msg3-DeltaPreamble—messagePowerOffsetGroupB; or if the potential MSGA payload size (UL data available for transmission plus MAC header and, where required, MAC CEs) is greater than the ra-MsgASizeGroupA and the pathloss is less than PCMAX (of the Serving Cell performing the Random Access Procedure)—msgA-PreambleReceivedTargetPower—msgA-DeltaPreamble—msgA-messagePowerOffsetGroupB. In such cases, depending on how the terminal device 120 evaluates the possible BFR MAC CE size to be transmitted, it may affect to if the terminal device 120 would select Random Access Preambles Group A or B. It should be noted that Random Access Preambles group B may generally lead to reduced coverage given the potentially bigger Msg3 or MsgA payload size. Hence, in some examples, it could be beneficial to select Random Access Preambles group A if BFR MAC CE is to be transmitted.

In some example embodiments, the terminal device 120 may evaluate the potential size of the BFR MAC CE based on the second number of serving cells so that the most optimized BFR MAC CE size is assumed. The second number of serving cells can be based on any of the embodiments as proposed above. In some example embodiments, the second number of serving cells is used to evaluate the potential size of the BFR MAC CE only in case beam failure is detected in SpCell. In some example embodiments, the terminal device 120 may select Random Access Preambles group A in case beam failure is detected in SpCell.

It would be appreciated that although the information concerning the beam failure detection included in a MAC CE is discussed, in some other example embodiments, the information may be transmitted to the network device 110 in other types of IEs.

Figure 5:
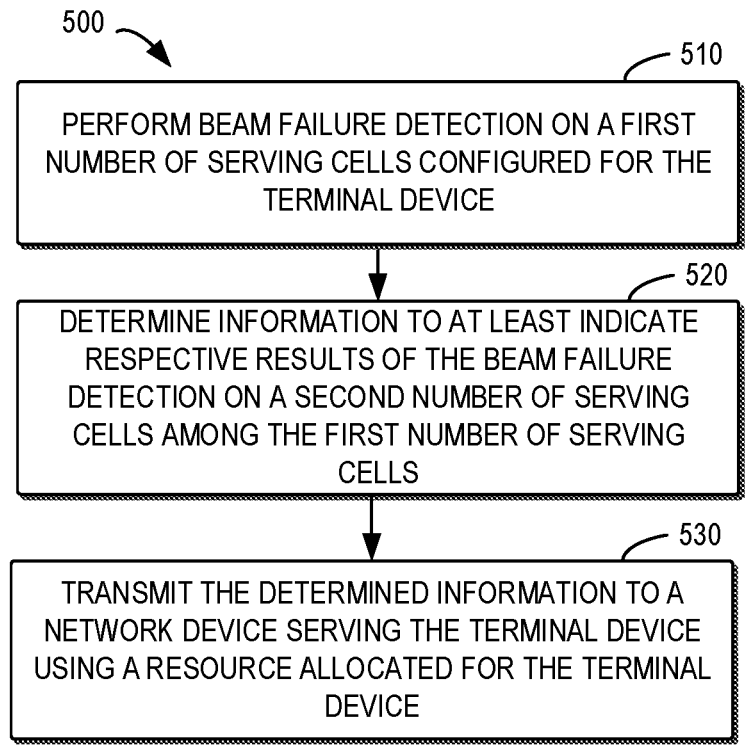
FIG. 5 illustrates a flowchart of a method implemented at a terminal device according to some other example embodiments of the present disclosure.

FIG. 5 shows a flowchart of an example method 500 implemented at a terminal device in accordance with some example embodiments of the present disclosure. For the purpose of discussion, the method 500 will be described from the perspective of the terminal device 120 with respect to FIG. 1.

At block 510, the terminal device 120 performs beam failure detection on a first number of serving cells configured for the terminal device. At block 520, the terminal device 120 determines information to at least indicate respective results of the beam failure detection on a second number of serving cells among the first number of serving cells, the second number being smaller than the first number. At block 530, the terminal device 120 transmits the determined information to a network device serving the terminal device using a resource allocated for the terminal device.

In some example embodiments, respective results of the beam failure detection on the first number of serving cells are expected to be indicated by the first number of bits in a bitmap corresponding to the first number of serving cells, and the determined information comprises a continuous part of the bitmap comprising the second number of bits corresponding to the second number of serving cells. In some example embodiments, transmitting the determined information comprises: transmitting the continuous part of the bitmap without transmitting a remaining part of the bitmap.

In some example embodiments, the determined information further comprises a first indication that further information concerning the beam failure detection on the first number of serving cells is to be conveyed to the network device.

In some example embodiments, the first number of serving cells are corresponding to the first number of bits in an order of cell indices of the first number of serving cells. In some example embodiments, determining the information comprises: in accordance with a determination that a beam failure is detected on at least one of the first number of serving cells, determining whether at least one bit corresponding to the at least one serving cell is comprised in the continuous part of the bitmap based on at least one cell index of the at least one serving cell; and in accordance with a determination that the at least one bit corresponding to the at least one serving cell is comprised in the continuous part of the bitmap, determining the continuous part of the bitmap to indicate the respective results of the beam failure detection on the second number of serving cells.

In some example embodiments, the determined information further comprises a second indication that no further information concerning the beam failure detection on the first number of serving cells is to be conveyed to the network device.

In some example embodiments, transmitting the determined information comprises: transmitting the determined information in accordance with at least one of the following: a determination that a beam failure is detected on a predetermined cell of the first number of serving cells, a determination that a random access procedure is initiated to transmit information concerning the beam failure detection, and a determination that the allocated resource is insufficient for transmission of information indicating respective results of the beam failure detection on the first number of serving cells.

In some example embodiments, the predetermined cell comprises a primary cell or a primary secondary cell.

In some example embodiments, determining the information comprises: in accordance with a determination that a beam failure is detected on a predetermined cell of the first number of serving cells, determining whether the allocated resource is sufficient for transmission of a payload portion of an information element indicating respective results of the beam failure detection on the first number of serving cells or a third predetermined number of serving cells, the third number being smaller than the first number and larger than the second number; and in accordance with a determination that the allocated resource is insufficient for the transmission of the payload portion, assigning a field in a header portion of the information element with a predetermined value to indicate that the beam failure is detected on the predetermined cell.

In some example embodiments, determining the information further comprises: in accordance with a detection that a further beam failure is detected on at least one further serving cell of the first number of serving cells, determining the header portion to comprise a first indication that further information concerning the beam failure detection on the first number of serving cells is to be conveyed to the network device; and in accordance with a detection that a beam failure is detected on only the predetermined cell, determining the header portion to comprise a second indication that no further information concerning the beam failure detection on the first number of serving cells is to be conveyed to the network device.

Figure 6:
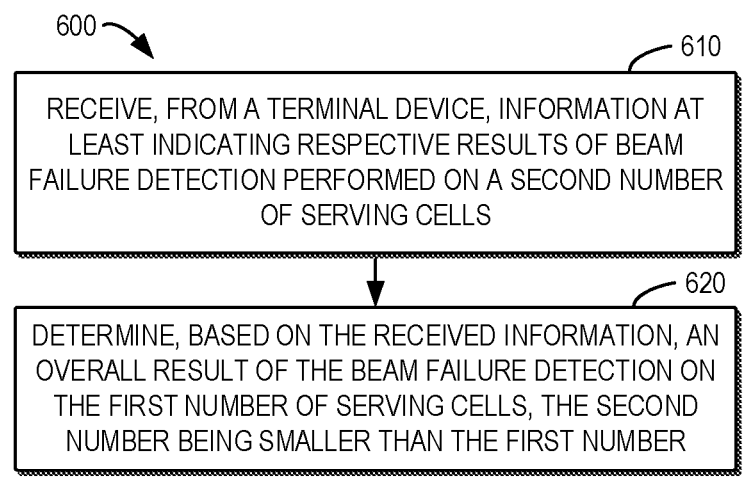
FIG. 6 illustrates a flowchart of a method implemented at a network device according to some other example embodiments of the present disclosure.

FIG. 6 shows a flowchart of an example method 600 implemented at a network device in accordance with some example embodiments of the present disclosure. For the purpose of discussion, the method 600 will be described from the perspective of the network device 110 with respect to FIG. 1.

At block 610, the network device 110 receives, from a terminal device, information at least indicating respective results of beam failure detection performed on a second number of serving cells. In accordance with a determination that a first number of serving cells are configured with beam failure detection by the terminal device, at block 620, the network device 110 determines, based on the received information, an overall result of the beam failure detection on the first number of serving cells, the second number being smaller than the first number.

In some example embodiments, respective results of the beam failure detection on the first number of serving cells are expected to be indicated by the first number of bits in a bitmap corresponding to the first number of serving cells, and the received information comprises a continuous part of the bitmap comprising the second number of bits corresponding to the second number of serving cells. In some example embodiments, receiving the information comprises: receiving the continuous part of the bitmap without receiving a remaining part of the bitmap.

In some example embodiments, the received information further comprises a first indication that further information concerning the beam failure detection on the first number of serving cells is to be conveyed to the network device. In some example embodiments, determining the overall result of beam failure detection comprises: determining, based on the continuous part of the bitmap and the first indication, that a beam failure is potentially detected by the terminal device on at least one further serving cell of the first number of serving cells other than the second number of serving cells.

In some example embodiments, the first number of serving cells are corresponding to the first number of bits in an order of cell indices of the first number of serving cells; and wherein the received information further comprises a second indication that no further information concerning the beam failure detection on the first number of serving cells is to be conveyed to the network device. In some example embodiments, determining the overall result of beam failure detection comprises: determining, from the continuous part of the bitmap and the second indication, that no beam failure is detected by the terminal device on remaining serving cells of the first number of serving cells other than the second number of serving cells.

In some example embodiments, the received information comprises a field in a header portion of an information element assigned with a predetermined value to indicate that a beam failure is detected on a predetermined cell of the first number of serving cells.

In some example embodiments, determining the overall result of beam failure detection comprises: in accordance with the received information further comprising in the header portion a first indication that further information concerning the beam failure detection on the first number of serving cells is to be conveyed to the network device, determining, based on the header portion and the first indication, that that a further beam failure is detected on at least one further serving cell of the first number of serving cells other than the predetermined cell, and in accordance with the received information further comprising in the header portion a second indication that no further information concerning the beam failure detection on the first number of serving cells is to be conveyed to the network device, determining, based on the header portion and the second indication, that no beam failure is detected on remaining serving cells of the first number of serving cells other than the predetermined cell.

In some example embodiments, a first apparatus capable of performing any of the method 500 (for example, the terminal device 120) may comprise means for performing the respective operations of the method 500. The means may be implemented in any suitable form. For example, the means may be implemented in a circuitry or software module. The first apparatus may be implemented as or included in the terminal device 120.

In some example embodiments, the first apparatus comprises means for: performing beam failure detection on a first number of serving cells configured for the first apparatus; determining information to at least indicate respective results of the beam failure detection on a second number of serving cells among the first number of serving cells, the second number being smaller than the first number; and transmitting the determined information to a second apparatus (e.g., implemented as or included in the network device 110) serving the first apparatus using a resource allocated for the first apparatus.

In some example embodiments, respective results of the beam failure detection on the first number of serving cells are expected to be indicated by the first number of bits in a bitmap corresponding to the first number of serving cells, and the determined information comprises a continuous part of the bitmap comprising the second number of bits corresponding to the second number of serving cells. In some example embodiments, the means for transmitting the determined information comprises means for: transmitting the continuous part of the bitmap without transmitting a remaining part of the bitmap.

In some example embodiments, the determined information further comprises a first indication that further information concerning the beam failure detection on the first number of serving cells is to be conveyed to the second apparatus.

In some example embodiments, the first number of serving cells are corresponding to the first number of bits in an order of cell indices of the first number of serving cells. In some example embodiments, the means for determining the information comprises means for: in accordance with a determination that a beam failure is detected on at least one of the first number of serving cells, determining whether at least one bit corresponding to the at least one serving cell is comprised in the continuous part of the bitmap based on at least one cell index of the at least one serving cell; and in accordance with a determination that the at least one bit corresponding to the at least one serving cell is comprised in the continuous part of the bitmap, determining the continuous part of the bitmap to indicate the respective results of the beam failure detection on the second number of serving cells.

In some example embodiments, the determined information further comprises a second indication that no further information concerning the beam failure detection on the first number of serving cells is to be conveyed to the second apparatus.

In some example embodiments, the means for transmitting the determined information comprises means for transmitting the determined information in accordance with at least one of the following: a determination that a beam failure is detected on a predetermined cell of the first number of serving cells, a determination that a random access procedure is initiated to transmit information concerning the beam failure detection, and a determination that the allocated resource is insufficient for transmission of information indicating respective results of the beam failure detection on the first number of serving cells.

In some example embodiments, the predetermined cell comprises a primary cell or a primary secondary cell.

In some example embodiments, the means for determining the information further comprises means for: in accordance with a detection that a further beam failure is detected on at least one further serving cell of the first number of serving cells, determining the header portion to comprise a first indication that further information concerning the beam failure detection on the first number of serving cells is to be conveyed to the second apparatus; and in accordance with a detection that a beam failure is detected on only the predetermined cell, determining the header portion to comprise a second indication that no further information concerning the beam failure detection on the first number of serving cells is to be conveyed to the second apparatus.

In some example embodiments, the first apparatus further comprises means for performing other operations in some example embodiments of the method 500. In some example embodiments, the means comprises at least one processor; and at least one memory including computer program code, the at least one memory and computer program code configured to, with the at least one processor, cause the performance of the first apparatus.

In some example embodiments, a second apparatus capable of performing any of the method 600 (for example, the network device 110) may comprise means for performing the respective operations of the method 600. The means may be implemented in any suitable form. For example, the means may be implemented in a circuitry or software module. The second apparatus may be implemented as or included in the network device 110.

In some example embodiments, the second apparatus comprises means for receiving, from the first apparatus (e.g. implemented as or included in the terminal device 120), information at least indicating respective results of beam failure detection performed on a second number of serving cells; and in accordance with a determination that a first number of serving cells are configured with beam failure detection by the first apparatus, determining, based on the received information, an overall result of the beam failure detection on the first number of serving cells, the second number being smaller than the first number.

In some example embodiments, respective results of the beam failure detection on the first number of serving cells are expected to be indicated by the first number of bits in a bitmap corresponding to the first number of serving cells, and the received information comprises a continuous part of the bitmap comprising the second number of bits corresponding to the second number of serving cells. In some example embodiments, the means for receiving the information comprises means for: receiving the continuous part of the bitmap without receiving a remaining part of the bitmap.

In some example embodiments, the received information further comprises a first indication that further information concerning the beam failure detection on the first number of serving cells is to be conveyed to the second apparatus. In some example embodiments, the means for determining the overall result of beam failure detection comprises means for: determining, based on the continuous part of the bitmap and the first indication, that a beam failure is potentially detected by the first apparatus on at least one further serving cell of the first number of serving cells other than the second number of serving cells.

In some example embodiments, the first number of serving cells are corresponding to the first number of bits in an order of cell indices of the first number of serving cells; and wherein the received information further comprises a second indication that no further information concerning the beam failure detection on the first number of serving cells is to be conveyed to the second apparatus. In some example embodiments, the means for determining the overall result of beam failure detection comprises means for: determining, from the continuous part of the bitmap and the second indication, that no beam failure is detected by the first apparatus on remaining serving cells of the first number of serving cells other than the second number of serving cells.

In some example embodiments, the received information comprises a field in a header portion of an information element assigned with a predetermined value to indicate that a beam failure is detected on a predetermined cell of the first number of serving cells.

In some example embodiments, the means for determining the overall result of beam failure detection comprises means for: in accordance with the received information further comprising in the header portion a first indication that further information concerning the beam failure detection on the first number of serving cells is to be conveyed to the second apparatus, determining, based on the header portion and the first indication, that that a further beam failure is detected on at least one further serving cell of the first number of serving cells other than the predetermined cell, and in accordance with the received information further comprising in the header portion a second indication that no further information concerning the beam failure detection on the first number of serving cells is to be conveyed to the second apparatus, determining, based on the header portion and the second indication, that no beam failure is detected on remaining serving cells of the first number of serving cells other than the predetermined cell.

In some example embodiments, the second apparatus further comprises means for performing other operations in some example embodiments of the method 600. In some example embodiments, the means comprises at least one processor; and at least one memory including computer program code, the at least one memory and computer program code configured to, with the at least one processor, cause the performance of the second apparatus.

Figure 7:
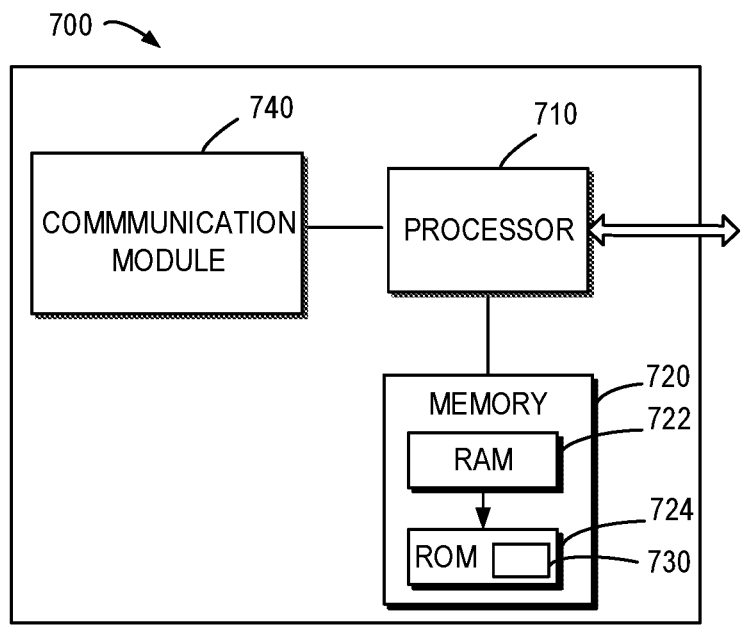
FIG. 7 illustrates a simplified block diagram of an apparatus that is suitable for implementing example embodiments of the present disclosure.

FIG. 7 is a simplified block diagram of a device 700 that is suitable for implementing example embodiments of the present disclosure. The device 700 may be provided to implement a communication device, for example, the network device 110 or the terminal device 120 as shown in FIG. 1. As shown, the device 700 includes one or more processors 710, one or more memories 720 coupled to the processor 710, and one or more communication modules 740 coupled to the processor 710.

The communication module 740 is for bidirectional communications. The communication module 740 has one or more communication interfaces to facilitate communication with one or more other modules or devices. The communication interfaces may represent any interface that is necessary for communication with other network elements. In some example embodiments, the communication module 740 may include at least one antenna.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the memory, e.g., ROM 724. The processor 710 may perform any suitable actions and processing by loading the program 730 into the RAM 722.

The example embodiments of the present disclosure may be implemented by means of the program 730 so that the device 700 may perform any process of the disclosure as discussed with reference to FIGS. 3-6. The example embodiments of the present disclosure may also be implemented by hardware or by a combination of software and hardware.

Figure 8:
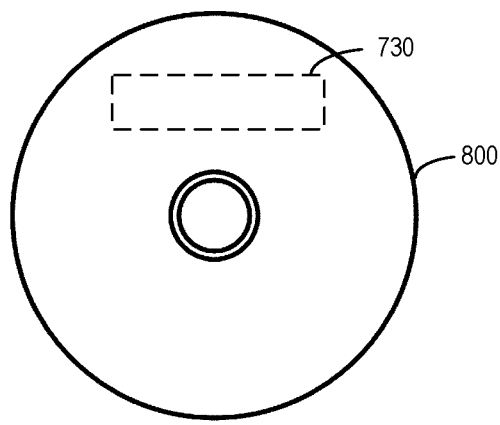
FIG. 8 illustrates a block diagram of an example computer readable medium in accordance with some example embodiments of the present disclosure.

In some example embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and the like. FIG. 8 shows an example of the computer readable medium 800 which may be in form of CD, DVD or other optical storage disk. The computer readable medium has the program 730 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target physical or virtual processor, to carry out any of the methods as described above with reference to FIGS. 3-6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

The invention claimed is:

1. A terminal device comprising:
    at least one processor; and
    at least one memory storing instructions thereon that, when executed by the at least one processor, cause the terminal device to perform at least:
        performing beam failure detection on a first number of serving cells configured for the terminal device;
        determining that a beam failure is detected on a predetermined serving cell of the first number of serving cells, wherein the predetermined serving cell comprises a special cell (SpCell);
        initiating a random access procedure;
        evaluating a potential size of medium access control (MAC) control elements (CEs) the terminal device is about to transmit along a MsgA or Msg3;
        selecting between Random Access Preambles group A and B for contention based random access depending on the evaluating of the potential size of MAC CEs;
    determining that an allocated resource is insufficient for transmission of information indicating respective results of the beam failure detection on the first number of serving cells, wherein the respective results of the beam failure detection on the first number of serving cells are expected to be indicated by a bitmap that is expected to be included in a beam failure recovery (BFR) MAC CE, and wherein the expected bitmap is a four-octet bitmap to indicate respective results of beam failure detection on up to third-two serving cells;
    determining information to at least indicate respective results of the beam failure detection on a second number of serving cells among the first number of serving cells, the second number being smaller than the first number, wherein a part of the expected bitmap corresponding to the first octet is included in the determined information and a remaining part of the expected bitmap is omitted; and
    transmitting, the determined information to a network device serving the terminal device using a resource allocated for the terminal device, wherein the determined information is included in a MAC CE, wherein the determined information is transmitted to the network deice in a message of the random access procedure, and wherein one bit in the first octet is used to indicate a result of beam failure detection on the SpCell.

2. The terminal device of claim 1, wherein the resource allocated for the terminal device is sufficient for the transmission of the indication of the results of the beam failure detection on the first number of serving cells.

3. The terminal device of claim 1, wherein the resource allocated for the terminal device is sufficient for the transmission of the indication of the results of the beam failure detection on the second number of serving cells.

4. The terminal device of claim 1, wherein each bit of the bitmap indicates whether the beam failure is detected or not on one serving cell of the first or the second number of serving cells.

5. The terminal device of claim 4, wherein each cell is associated with a different cell index.

6. The terminal device of claim 5, wherein one bit of the bitmap corresponds to one cell associated with the cell index of that serving cell.

7. The terminal device of claim 5, wherein one bit corresponds to the cell index of the predetermined serving cell.

8. The terminal device of claim 1, wherein the bitmap is one-octet.

9. A method comprising:
performing beam failure detection on a first number of serving cells configured for a terminal device;
determining that a beam failure is detected on a predetermined serving cell of the first number of serving cells, wherein the predetermined serving cell comprises a special cell (SpCell);
initiating a random access procedure;
evaluating a potential size of medium access control (MAC) control elements (CEs) the terminal device is about to transmit along a MsgA or Msg3;
selecting between Random Access Preambles group A and B for contention based random access depending on the evaluating of the potential size of MAC CEs;
determining that an allocated resource is insufficient for transmission of information indicating respective results of the beam failure detection on the first number of serving cells, wherein the respective results of the beam failure detection on the first number of serving cells are expected to be indicated by a bitmap that is expected to be included in a beam failure recovery (BFR) MAC CE, and wherein the expected bitmap is a four-octet bitmap to indicate respective results of beam failure detection on up to thirty-two serving cells;
determining information to at least indicate respective results of the beam failure detection on a second number of serving cells among the first number of serving cells, the second number being smaller than the first number, wherein a part of the expected bitmap corresponding to the first octet is included in the determined information and a remaining part of the expected bitmap is omitted; and
transmitting the determined information to a network device serving the terminal device using a resource allocated for the terminal device, wherein the determined information is included in a MAC CE, wherein the determined information is transmitted to the network device in a message of the random access procedure, and wherein one bit in the first octet is used to indicate a result of beam failure detection on the SpCell.

10. The method of claim 9, wherein the resource allocated for the terminal device is sufficient for the transmission of the indication of the results of the beam failure detection on the first number of serving cells.

11. The method of claim 9, wherein the resource allocated for the terminal device is insufficient for the transmission of the indication of the results of the beam failure detection on the first number of serving cells.

12. The method of claim 9, wherein each bit of the bitmap indicates whether the beam failure is detected or not on one serving cell of the first or the second number of serving cells.

13. The method of claim 12, wherein each cell is associated with a different cell index.

14. The method of claim 13, wherein one bit of the bitmap corresponds to one cell associated with the cell index of that serving cell.

15. The method of claim 13, wherein one bit corresponds to the cell index of the predetermined serving cell.

16. The method of claim 9, wherein the bitmap is one-octet.

17. A non-transitory computer-readable medium storing program code that, when executed by a processor, causes a terminal device to carry out at least:
performing beam failure detection on a first number of serving cells configured for the terminal device;
determining that a beam failure is detected on a predetermined serving cell of the first number of serving cells, wherein the predetermined serving cell comprises a special cell (SpCell);
initiating a random access procedure;
evaluating a potential size of medium access control (MAC) control elements (CEs) the terminal device is about to transmit along a MsgA or Msg3;
selecting between Random Access Preamble groups A and B for contention based random access depending on the evaluating of the potential size of MAC CEs;
determining that an allocated resource is insufficient for transmission of information indicating respective results of the beam failure detection on the first number of serving cells, wherein the respective results of the beam failure detection on the first number of serving cells are expected to be indicated by a bitmap that is expected to be included in a beam failure recovery (BFR) MAC CE, and wherein the expected bitmap is a four-octet bitmap to indicate respective results of beam failure detection on up to thirty-two serving cells;
determining information to at least indicate respective results of the beam failure detection on a second number of serving cells among the first number of serving cells, the second number being smaller than the first number, wherein a part of the expected bitmap corresponding to the first octet is included in the determined information and a remaining part of the expected bitmap is omitted; and
transmitting the determined information to a network device serving the terminal device using a resource allocated for the terminal device, wherein the determined information is included in a MAC CE, wherein the determined information is transmitted to the network device in a message of the random access procedure, and wherein one bit in the first octet is used to indicate a result of beam failure detection on the SpCell.

18. The computer-readable medium of claim 17, wherein the resource allocated for the terminal device is sufficient for the transmission of the indication of the results of the beam failure detection on the first number of serving cells.

19. The computer-readable medium of claim 17, wherein the resource allocated for the terminal device is sufficient for the transmission of the indication of the results of the beam failure detection on the second number of serving cells.

20. The computer-readable medium of claim 17, wherein each bit of the bitmap indicates whether the beam failure is detected or not on one serving cell of the first or the second number of serving cells.

21. The computer-readable medium of claim 20, wherein each cell is associated with a different cell index.

22. The computer-readable medium of claim 21, wherein one bit of the bitmap corresponds to one cell associated with the cell index of that serving cell.

23. The computer-readable medium of claim 21, wherein one bit corresponds to the cell index of the predetermined serving cell.

24. The computer-readable medium of claim 17, wherein the bitmap is one-octet.

25. A terminal device comprising:
at least one processor; and
at least one memory storing instructions thereon that, when executed by the at least one processor, cause the terminal device to perform at least:
- performing beam failure detection on a first number of serving cells configured for the terminal device, wherein the first number of serving cells comprises a special cell (SpCell) and a plurality of secondary cells (SCells);
- determining that a beam failure is detected on a predetermined cell of a second number of serving cells, wherein the predetermined cell comprises the SpCell and/or at least one SCell, the second number being smaller than the first number;
- determining that an allocated resource is insufficient for transmission of information indicating respective results of the beam failure detection on the first number of serving cells; wherein the respective results of the beam failure detection on the first number of serving cells are expected to be indicated by a four-octet bitmap included in a truncated BFR MAC CE, the four-octet bitmap being operable to indicate respective results of beam failure detection on up to thirty-two serving cells;
- determining information to indicate respective results of the beam failure detected on the second number of serving cells, wherein a part of the four-octet bitmap corresponding to a first octet of the four-octet bitmap is included in the determined information and a remaining part of the four-octet bitmap is omitted;
- evaluating a potential size of MAC CEs the terminal device is about to transmit along a MsgA or Msg3 of a random access procedure;
- selecting between Random Access Preambles group A and group B for contention based random access depending on the potential size of the MAC CEs; and
- transmitting, in a MAC CE in a message of the random access procedure, the determined information to a network device serving the terminal device using a random access resource allocated for the terminal device, wherein one bit in the first octet is used to indicate a result of beam failure detection on the SpCell.

* * * * *

UNITED STATES PATENT AND TRADEMARK OFFICE
CERTIFICATE OF CORRECTION

PATENT NO. : 11,916,640 B2
APPLICATION NO. : 17/879437
DATED : February 27, 2024
INVENTOR(S) : Samuli Turtinen et al.

Page 1 of 1

It is certified that error appears in the above-identified patent and that said Letters Patent is hereby corrected as shown below:

On the Title Page

In Column 1, item (30), Foreign Application Priority Data, Line 1, delete "Jun. 4, 2020" and insert -- April 6, 2020 --, therefor.

In Column 1, item (30), Foreign Application Priority Data, Line 1, delete "(WO)" and insert -- (CN) --, therefor.

In the Claims

In Column 26, Line 45, Claim 1, delete "transmitting," and insert -- transmitting --, therefor.

In Column 27, Line 55, Claim 11, delete "is insufficient" and insert -- is sufficient --, therefor.

In Column 27, Line 57, Claim 11, delete "first number" and insert -- second number --, therefor.

Signed and Sealed this
Eighteenth Day of February, 2025

Coke Morgan Stewart
*Acting Director of the United States Patent and Trademark Office*